US012743332B2

(12) United States Patent
Kombra et al.

(10) Patent No.: US 12,743,332 B2
(45) Date of Patent: Sep. 22, 2026

(54) AUTOMATED ERROR IDENTIFICATION AND REMEDIATION BASED ON A PLURALITY OF DATA SOURCES

(71) Applicant: Capital One Services, LLC, McLean, VA (US)

(72) Inventors: Ajay Kannoth Kombra, Glen Allen, VA (US); Jude Luis Savio Pereira, Glen Allen, VA (US); Robert Marriott, Fairfax, VA (US); Nicholas Zolnoor, Fairfax, VA (US); John C. Zaragoza, Jr., Hickory Creek, TX (US); Scott Alexander Brown, McLean, VA (US); Gurjeet Chinayna, Ashburn, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/637,080

(22) Filed: Apr. 16, 2024

(65) Prior Publication Data

US 2025/0321824 A1 Oct. 16, 2025

(51) Int. Cl.
*G06F 11/07* (2006.01)

(52) U.S. Cl.
CPC ...... *G06F 11/0793* (2013.01); *G06F 11/0709* (2013.01); *G06F 11/079* (2013.01)

(58) Field of Classification Search
CPC . G06F 11/0709; G06F 11/079; G06F 11/0793
See application file for complete search history.

(56) References Cited

U.S. PATENT DOCUMENTS

| | | | | |
|---|---|---|---|---|
| 10,430,517 | B1 * | 10/2019 | Mulwad | G06F 11/0793 |
| 10,649,833 | B1 * | 5/2020 | Dutch | G06F 11/0793 |
| 12,056,003 | B1 * | 8/2024 | Ramos | G06F 11/0793 |
| 2020/0327005 | A1 * | 10/2020 | Singh | G06F 11/302 |
| 2020/0364581 | A1 * | 11/2020 | Kuo | G06N 3/10 |

(Continued)

OTHER PUBLICATIONS

"Support Log Analyzer Tool" published Jul. 1, 2019 <https://help.salesforce.com/s/articleView?id=001117167&type=1>, website visited Apr. 12, 2024.

(Continued)

*Primary Examiner* — Marc Duncan
*Assistant Examiner* — Albert Li
(74) *Attorney, Agent, or Firm* — Banner & Witcoff, Ltd.

(57) ABSTRACT

The present disclosure describes a method and apparatus for an error remediation recommendation process based on multiple data sources. Aspects of the disclosure may provide for processing of a knowledgebase to identify error remediation recommendations, processing of a chat log to identify error remediation recommendations, identification of errors from log data, determination of a corresponding error remediation recommendation from the knowledgebase and/or the chat log, and causing display of output indicating a corresponding error remediation recommendation. Further aspects described may also provide for training of an artificial neural network to determine a corresponding error remediation recommendation. Further aspects described may also provide for a browser extension which scrapes the Document Object Model (DOM) of a web page to identify errors.

20 Claims, 5 Drawing Sheets

(56) References Cited

U.S. PATENT DOCUMENTS

| | | | | |
|---|---|---|---|---|
| 2021/0248024 | A1* | 8/2021 | Poola | G06F 11/0793 |
| 2022/0019496 | A1* | 1/2022 | Lozano | G06F 11/0778 |
| 2023/0047437 | A1* | 2/2023 | Kolar | G06N 20/00 |

OTHER PUBLICATIONS

SAP—Technology Blogs by Members: "Support Log Assistant 2.0—Self Service Too for Analyzing Issues", 6 pages <https://community.sap.com/t5/technology-blogs-by-members/support-log-assistant-2-0-self-service-tool-for-analyzing-issues/ba-p/13482956>, website visited Apr. 12, 2024.

May 10, 2021—Opensource.com "Make Jenkins Logs Pretty" pp. 1-6 <https://opensource.com/article/21/5/jenkins-logs> , website visited Apr. 12, 2024.

Jun. 3, 2021—Medium "Log Enhancer Chrome Extension" pp. 1-6 <https://medium.com/@tsaibot/log-enhancer-chrome-extension-210b28e5f5>, website visited Apr. 12, 2024.

Nov. 1, 2023'Medium "log Enhancer Chrome Extension v2" pp. 1-6 <https://medium.com/@tsaibot/log-enhancer-chrome-extension-v2-bd5e05965465> ,website visited Apr. 12, 2026.

Datadog "Log Analysis and Troubleshooting" pp. 1-3 and 1-6 <https://medium.com/@tsaibot/log-enhancer-chrome-extension-v2-bd5e05965465>, website visited Apr. 12, 2024.

LogViewPlus "Quick and Clear Log Analysis" pp. 1-5 <https://www.logviewplus.com/>, website visited Apr. 12, 2024.

Jenkins—"Jenkins User Documentation" 9 pages <https://www.jenkins.io/doc/> <https://www.jenkins.io/doc/book/pipeline/> <https://www.jenkins.io/doc/book/troubleshooting/obtaining-a-thread-dump/>, website visited Apr. 12, 2024.

Wikipedia "Jenkins (software)" 3 pages <https://en.wikipedia.org/wiki/Jenkins_(software)>, website visited Apr. 12, 2024.

* cited by examiner

AUTOMATED ERROR IDENTIFICATION AND REMEDIATION BASED ON A PLURALITY OF DATA SOURCES

FIELD OF THE INVENTION

Aspects of the disclosure generally relate to a computing device processing a plurality of data sources to identify error remediation recommendations, identifying errors from a plurality of log entries, determining error remediation recommendations from the plurality of data sources which correspond to the errors, and causing display of error remediation recommendations.

BACKGROUND OF THE INVENTION

Error identification and remediation are important processes in the development and maintenance of computing and server systems. Identifying errors from a system output is often laborious and time-consuming, as errors may not be clearly labeled. Additionally, once an error has been identified, an engineer responsible for addressing the error may be required to check multiple data sources to determine the correct error remediation procedure.

Assume, for example, that an administrator of a system receives an error message that the administrator has never seen before. Conventionally, that administrator might be forced to search various data sources (e.g., instruction manuals, support forums, knowledgebases) to glean a solution to the problem. This process can be frustrating, especially when the error is not descriptive and in circumstances where the administrator does not have much time. Moreover, the process can be even more frustrating when different data sources conflict: for example, an instruction manual might provide radically different solutions to an error than a support forum, and the administrator might be forced to guess which solution best addresses the problem. In some situations, the administrator may be forced to try two or more solutions—a time-consuming process that can risk the security of computing resources.

SUMMARY OF THE INVENTION

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may relate to processing of a plurality of data sources to identify error remediation recommendations identifying an error from a plurality of log entries, determining error remediation recommendations from the plurality of data sources which correspond to the error, and causing the display of output indicating the error remediation recommendations. These aspects may allow a user to quickly identify errors from a plurality of log entries and view error remediation recommendations from a plurality of data sources in a single location, improving error remediation speed. Aspects described herein may further relate to processing the plurality of data sources using natural language processing algorithms and training and using machine learning models to determine corresponding error remediation recommendations. Aspects described herein may further relate to using a browser extension to scrape the Document Object Model (DOM) of a web page to identify errors, allowing a user to quickly identify errors displayed to the web page and which are logged to a browser.

For example, a computing device may be configured to provide automatic error remediation recommendation, where the computing device comprises one or more processors and memory storing instructions. The instructions, when executed by the one or more processors, may cause the computing device to process a knowledgebase to identify a first plurality of error remediation recommendations and process a chat log comprising a history of text messages to identify a second plurality of error remediation recommendations. The instructions, when executed by the one or more processors, may further cause the computing device to receive log data comprising a plurality of log entries and identify, from the log data, a first log entry corresponding to a first error. The instructions, when executed by the one or more processors, may further cause the computing device to, based on determining a first error remediation recommendation in the first plurality corresponds to the first error, cause a first output to be displayed indicating the first error remediation recommendation. The instructions, when executed by the one or more processors, may further cause the computing device to, based on determining a second error remediation recommendation in the second plurality corresponds to the first error: cause a second output to be displayed indicating the second error remediation recommendation.

The instructions, when executed by the one or more processors, may further cause the computing device to process the log data to identify a third log entry corresponding to a third error and provide, based on a determination that the third error does not correspond to any of the first or second pluralities of error remediation recommendations, at least a portion of the third log entry as input to a trained machine learning model. The instructions may further cause the computing device to receive, as output from the trained machine learning model, a model-generated error remediation recommendation and cause an output to be displayed, where the output indicates the model-generated error remediation recommendation. The instructions may further cause the computing device to receive, from a user, an indication whether the model-generated error remediation recommendation fixed the third error and further train, based on the indication whether the model-generated error remediation recommendation fixed the third error, the trained machine learning model.

The instructions, when executed by the one or more processors, may further cause the computing device to process the knowledgebase by training an artificial neural network comprising one or more nodes using training data comprising at least a portion of the knowledge base, wherein training the artificial neural network comprises modifying one or more weights of the one or more nodes of the artificial neural network based on the training data. The instructions, when executed by the one or more processors, may further cause the computing device to process the knowledgebase by searching, based on the first error, the knowledgebase for error remediation recommendations corresponding to the first error. The instructions, when executed by the one or more processors, may further cause the computing device to process searching, based on the first error, the chat log for error remediation recommendations corresponding to the first error.

The instructions, when executed by the one or more processors, may further cause the computing device to receive, via a browser extension operating on a browser on a user device, the log data, wherein the log data comprises data in the Document Object Model (DOM) of a web page displayed by the browser on the user device. The instructions, when executed by the one or more processors, may further cause the computing device to receive log data by parsing a file comprising the log data, wherein the log data is formatted in a serialized data format. The instructions, when executed by the one or more processors, may further cause the computing device to process the chat log via a natural language processing algorithm.

The log data may further comprise output, from a first computing device, indicating a status for a plurality of threads running on the first computing device, wherein a thread corresponds to a computing process on the first computing device. The instructions may further cause the computing device to identify the first log entry by comparing at least the first log entry to a regular expression. The chat log may further comprise a history of text messages, wherein the text messages comprise messages sent between users via an enterprise text messaging system.

A computer-implemented method may comprise processing a knowledgebase to identify a first plurality of error remediation recommendations and processing a chat log comprising a history of text messages to identify a second plurality of error remediation recommendations. This method may further comprise receiving, via a browser extension operating on a browser on a user device, log data comprising a plurality of log entries, wherein the log data comprises data in the Document Object Model (DOM) of a web page displayed by the browser on the user device and identifying, from the log data, a first log entry corresponding to a first error. This method may further comprise, based on determining a first error remediation recommendation in the first plurality corresponds to the first error, causing a first output to be displayed indicating the first error remediation recommendation; and, based on determining a second error remediation recommendation in the second plurality corresponds to the first error, causing a second output to be displayed indicating the second error remediation recommendation.

The method may further comprise processing the knowledgebase by training an artificial neural network comprising one or more nodes using training data comprising at least a portion of the knowledge base, wherein training the artificial neural network comprises modifying one or more weights of the one or more nodes of the artificial neural network based on the training data. The method may further comprise processing the chat log via a natural language processing algorithm.

One or more non-transitory computer-readable media storing instructions that, when executed by one or more processors, may cause a computing device to perform steps comprising: processing a knowledgebase to identify a first plurality of error remediation recommendations and processing, using a natural language processing algorithm, a chat log comprising a history of text messages to identify a second plurality of error remediation recommendations. The computing device may receive log data comprising a plurality of log entries and identify, from the log data, a first log entry corresponding to a first error. The computing device may, based on determining a first error remediation recommendation in the first plurality corresponds to the first error, cause a first output to be displayed indicating the first error remediation recommendation; and, based on determining a second error remediation recommendation in the second plurality corresponds to the first error, may cause a second output to be displayed indicating the second error remediation recommendation.

The one or more non-transitory computer-readable media storing instructions may, when executed by one or more processors, further cause a computing device to process the log data to identify a third log entry corresponding to a third error and provide, based on a determination that the third error does not correspond to any of the first or second pluralities of error remediation recommendations, at least a portion of the third log entry as input to a trained machine learning model. The one or more non-transitory computer-readable media storing instructions may, when executed by one or more processors, further cause a computing device to receive, as output from the trained machine learning model, a model-generated error remediation recommendation; and cause an output to be displayed, where the output indicates the model-generated error remediation recommendation.

The one or more non-transitory computer-readable media storing instructions may, when executed by one or more processors, further cause a computing device to receive, from a user, an indication whether the model-generated error remediation recommendation fixed the third error; and further train, based on the indication whether the model-generated error remediation recommendation fixed the third error, the trained machine learning model. The one or more non-transitory computer-readable media storing instructions may, when executed by one or more processors, further cause a computing device to process the chat log via a natural language processing algorithm. The one or more non-transitory computer-readable media storing instructions of claim 17, that, when executed by one or more processors, further cause a computing device to receive log data by receiving, from a first computing device, output indicating a status for a plurality of threads running on the first computing device, wherein a thread corresponds to a computing process on the first computing device.

BRIEF DESCRIPTION OF DRAWINGS

The present disclosure is illustrated by way of example and not limited in the accompanying figures in which like reference numerals indicate similar elements and in which.

DETAILED DESCRIPTION

Figure 1:
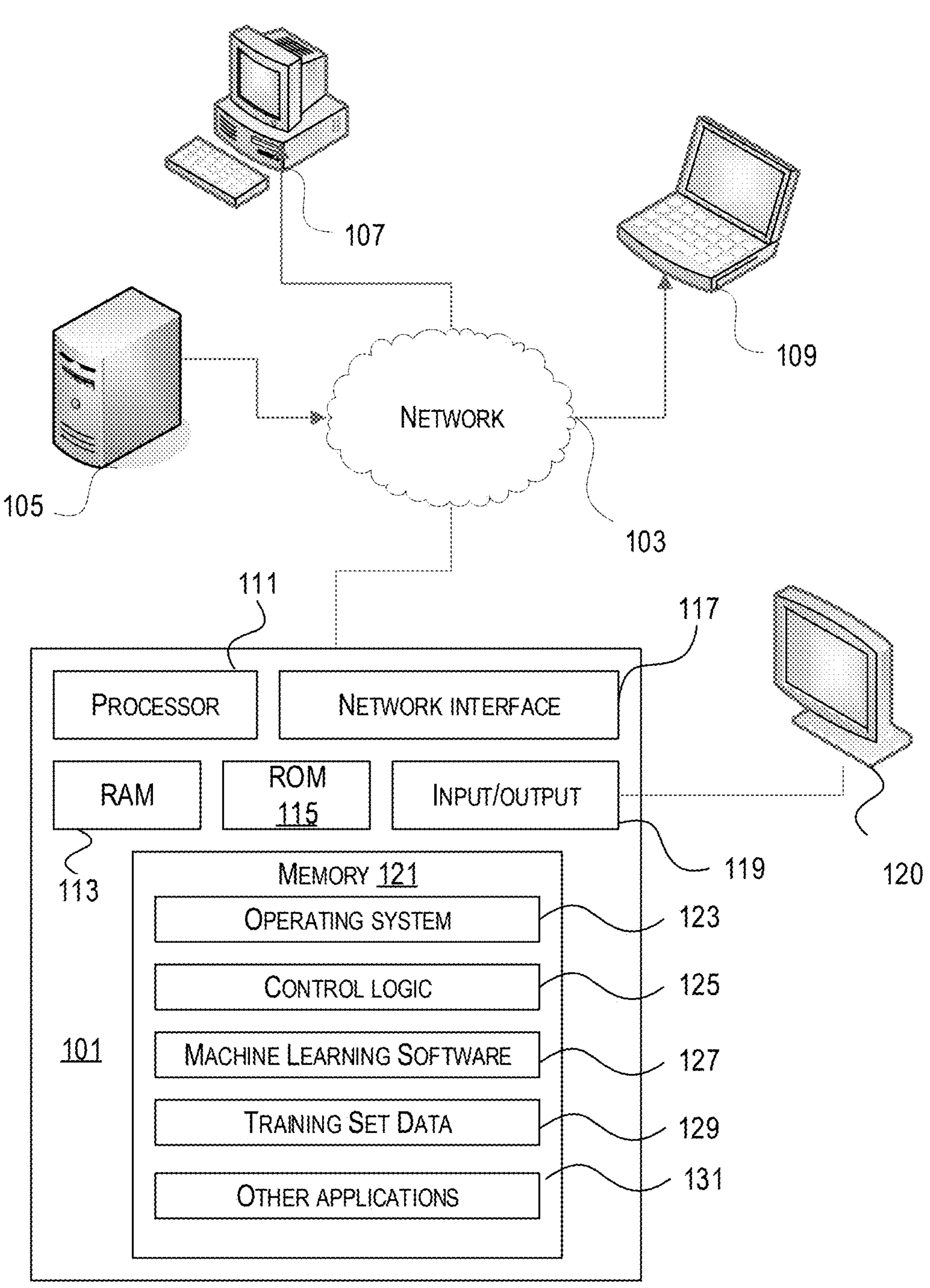
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Aspects described herein include a method for processing a plurality of data sources to identify a plurality of error remediation recommendations, identifying an error in a plurality of log entries, determining corresponding error remediation recommendations, and causing the display of output indicating the corresponding error remediation recommendations. Aspects described also provide for processing a knowledgebase to identify a first plurality of error remediation recommendations and processing a chat log to identify a second plurality of error remediation recommendations, allowing a user to view error remediation recommendations from a plurality of data sources, wherein the data sources may be public and/or private. Aspects described also provide for improved viewing of error remediation recommendations from multiple data sources, potentially private and public data sources. Aspects described may also further improve identification of errors from within a plurality of log entries. Aspects described may further relate to a browser extension which may scrape log entries from the Document Object Model (DOM), identify errors, and display output for corresponding error remediation recommendations, allowing users to quickly identify and remediate errors displayed within a web browser.

Aspects described herein improve the functioning of computers because directly relating to the diagnosis and remediation of computer errors. The sheer quantity of content available for error remediation recommendations in computing systems (e.g., knowledgebases, chat rooms, discussion forums, instruction manuals) can make remediation of certain computer errors difficult and time-consuming. By processing these data sources and analyzing different possible solutions to the same problem, aspects described herein leverage computer processing techniques to increase the speed and effectiveness with which computer problems are diagnosed and remediated. A human could not perform such steps mentally or otherwise: the errors themselves are related to computers, the data sources used to remediate such errors are computer-implemented, and the processes described herein for understanding such data sources (e.g., use of machine learning) cannot be performed by humans.

Aspects described herein also improve the identification of computer errors by improving processing and identification speed for computer errors. Many computing errors may not clearly indicate the source nor the location of an error. Requiring a human to parse through many lines of output and identify an error may be very difficult and very time-consuming. Further identifying the location of the fault causing the error may take additional time. By processing and identifying these errors, aspects described leverage computing processing techniques to increase the speed and efficiency with which errors may be identified.

Aspects described herein also improve identification and remediation of errors displayed in the Document Object Model (DOM) of a web page and/or a browser. By incorporating a browser extension into the browser receiving and/or displaying errors, a human can identify errors much more quickly compared to a manual process. Additionally, the browser extension may speed up the process of identifying error remediation recommendations without requiring a user to navigate away from the page displaying errors.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 131. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
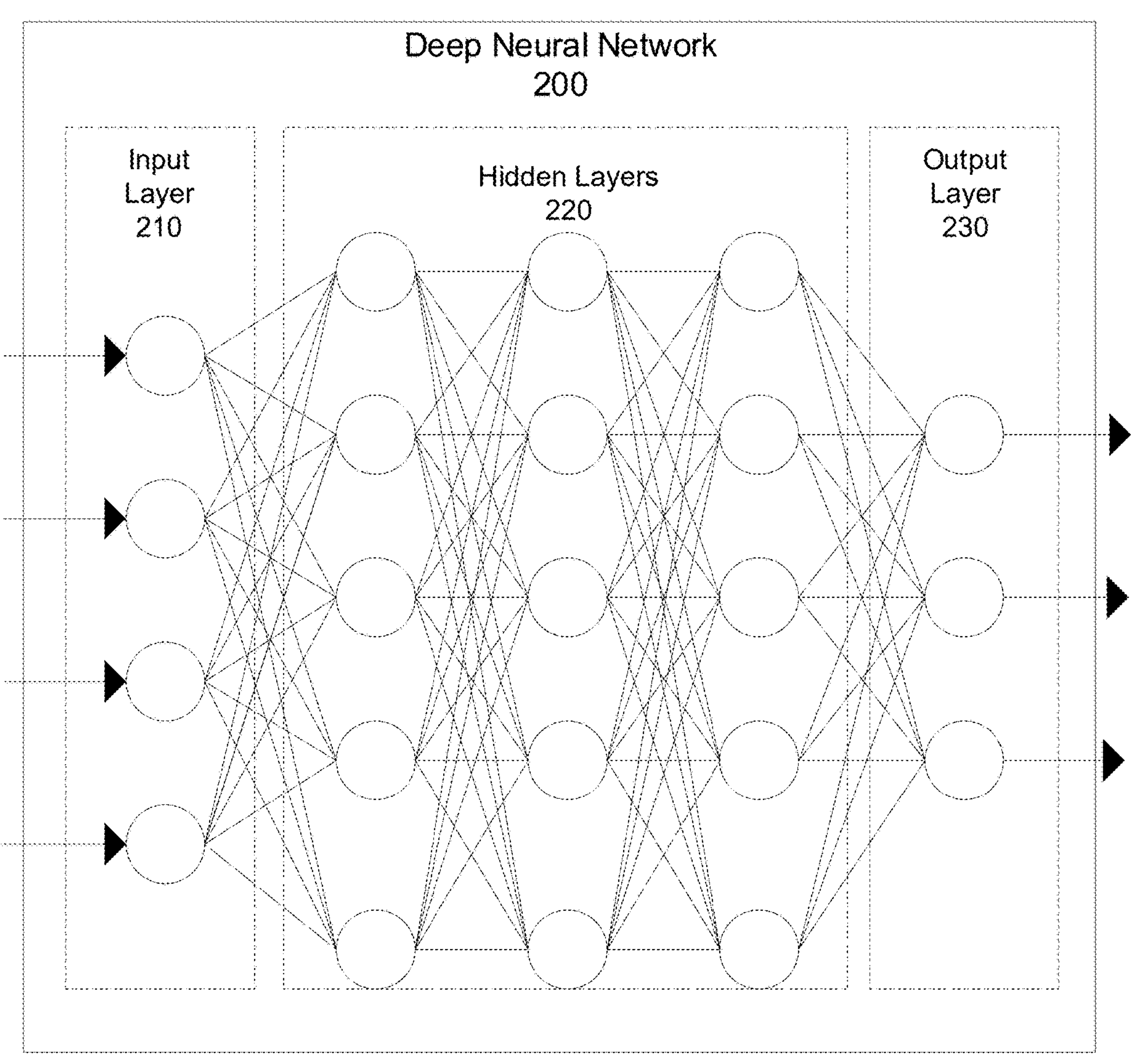
FIG. 2 depicts an example deep neural network architecture for a model according to one or more aspects of the disclosure.

FIG. 2 illustrates an example of a deep neural network architecture 200. Such a deep neural network architecture may be all or portions of the machine learning software 127 shown in FIG. 1. That said, the architecture depicted in FIG. 2 need not be performed on a single computing device, and may be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network architecture 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
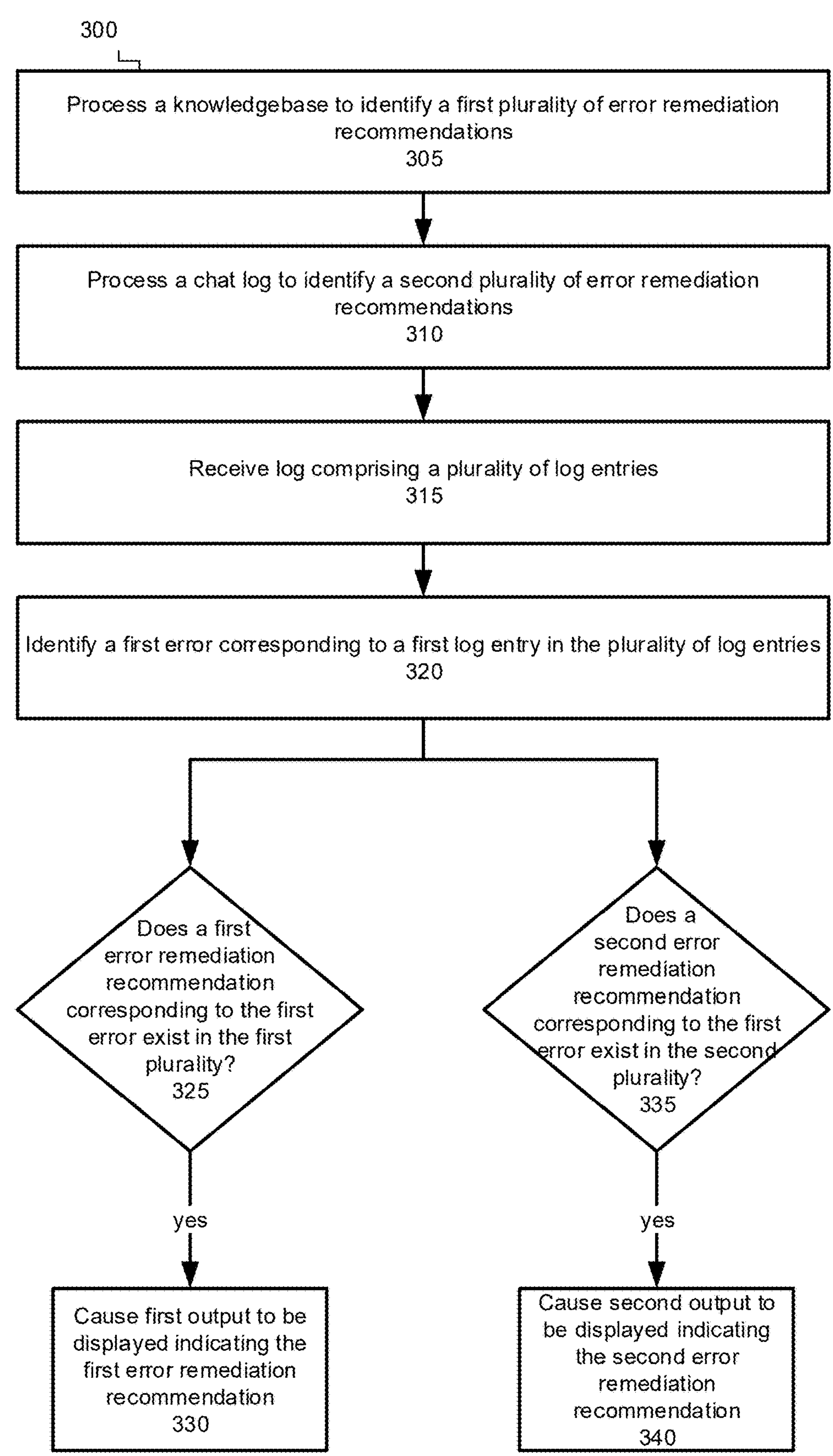
FIG. 3 depicts an example method of processing a knowledgebase and a chat log to identify pluralities of error remediation recommendations, receive a plurality of log entries, identify an error in the plurality of log entries, determine corresponding error remediation recommendations, and cause the corresponding error remediation recommendations to be displayed.

Aspects described herein comprise a method and apparatus for automating error remediation recommendations using a plurality of data sources to identify error remediation recommendations, identifying errors, and determining error remediation recommendations corresponding to the identified errors. FIG. 3 shows a flow chart of a process for processing a plurality of data sources into a plurality of error remediation recommendations, receiving a plurality log entries, identifying errors in the plurality of log entries, determining a corresponding error remediation recommendation in the pluralities of error remediation recommendations, and causing the error remediation recommendation to be displayed. Some or all of the steps of process 300 may be performed using one or more computing devices as described herein, including, for example, computing device 101 and/or device 105, 107, 109, or any combination thereof.

In step 305, a computing device may process a knowledgebase to identify a first plurality of error remediation recommendations. The computing device may process the knowledgebase via one or more potential methods. For example, the computing device may process the knowledgebase via a natural language processing (NLP) algorithm, such as Natural Language Toolkit (NLTK), Google Cloud, IBM Watson, and other equivalents thereof. The computing device may process the knowledgebase by implementing a search engine for the knowledgebase. It will be appreciated that implementing a search engine may comprise standard search techniques, such as indexing, stemming, fuzzy matching, and/or others. Additionally or alternatively, the computing device may process the knowledgebase by training a first artificial neural network, similar to the neural network described in FIG. 2, based on the knowledgebase. It will be appreciated that one or more of these methods may be used in processing the knowledgebase, based on the knowledgebase, the method, and/or other factors.

The knowledgebase may comprise one or more code repositories, for example a plurality of GitHub repositories, from which the computing device may process code, environment variables, documentation, and other similar files stored via GitHub or similar source version management systems. The knowledgebase may also comprise public and/or private repositories; in the case of private repositories, the private repositories may be accessible to the implementing entity but not to the public. Additionally or alternatively, the knowledgebase may comprise private records which are not exposed to the public and not accessible through standard Internet search algorithms such as Google, Bing, DuckDuckGo, or other equivalents thereof. For example, an entity with internal software development and/or maintenance guidelines may use a knowledgebase that comprises internal software development and/or maintenance guidelines. Internal documentation may also comprise additional guidance documentation for "internal use only" designations. The knowledgebase may also comprise, for example, client-facing documentation which is not exposed to the general public, such as documentation only available to subscribers of a product provided by the entity and employees of that entity. Additionally or alternatively, the knowledgebase may comprise entity records which are exposed to the general public, such as a public code repository exposed to the general public for integration guidance. Implementing the aspects described here with a knowledgebase which comprises code repositories, entity documentation, and/or other private records may allow users to determine more accurate error remediation recommendations, as error remediation recommendations may consider entity-specific information.

Additionally or alternatively, the knowledgebase may comprise Internet-accessible records, such as results from Google, Wikipedia, Application Programming Interface (API) documentation, and/or the like. Implementing the aspects described with a knowledgebase based on Internet-accessible records may provide for more efficient error remediation, as a user may be able to more quickly determine an error remediation recommendation and/or compare error remediation recommendations from multiple sources.

In step 310, the computing device may process a chat log comprising a history of text messages to identify a second plurality of error remediation recommendations. The computing device may process the chat log via one or more potential methods. For example, the computing device may process the chat log via a natural language processing (NLP) algorithm, such as Natural Language Toolkit (NLTK), Google Cloud, IBM Watson, and other equivalents thereof. The computing device may process the chat log by implementing a search engine for the chat log. It will be appreciated that implementing a search engine may comprise standard search techniques, such as indexing, stemming, fuzzy matching, and/or others. Additionally or alternatively, the computing device may process the chat log by training a second artificial neural network, similar to the neural network described in FIG. 2, based on the chat log. It will be appreciated that one or more of these methods may be used for processing the chat log, based on the chat log, the methods, and/or other factors.

The chat log may comprise a history of text messages. The history of text messages may comprise messages sent over an enterprise messaging system, such as Slack, Microsoft Teams, Discord, Internet Relay Chat (IRC), and/or equivalents thereof. The enterprise messaging system may have private messaging services allowing members of a given entity to speak with other members of the entity, but are not accessible to non-members: for example, a "workspace" in Slack, a "server" in Discord, and/or other equivalents thereof. Additionally or alternatively, the enterprise messaging system may allow any user to message any other user with the correct user identifier. The history of text messages corresponding to a given entity may not be accessible except by members of the entity. Implementing the error remediation recommendation process with the chat log may improve error remediation, as users may be able to identify error remediation recommendations based on other users who are members of the same entity. Additionally, implementing the error remediation process with the chat log may allow for improved determination of corresponding error remediation recommendations, as many enterprise messaging systems are not indexed on standard search engines and may not be easy to search when attempting to remedy an error. Processing the chat log may also further improve error remediation by determining if previous users had seen and resolved an identical or similar error.

Additionally or alternatively, the history of text messages may comprise posts made by users on an Internet-accessible website, such as Reddit, Stack Exchange (e.g., StackOverflow), Quora, and/or equivalents thereof. The history of text messages may comprise messages viewable to the general public and/or messages in "private" forums, where messages in a given forum may not be accessible to users who are not a member of the given forum. The history of text messages may also comprise only specific subsets of text messages. For example, a history of text messages comprising posts on Reddit may only comprise posts from one or more relevant "subreddits", such as r/techsupport. Additionally or alternatively, the history of text messages may be accessible and/or indexed by standard search engines, such as Google, Bing, DuckDuckGo, and other equivalents thereof.

In step 315, the computing device may receive log data comprising a plurality of log entries. The computing device may receive the log data by, via a browser extension, scraping the Document Object Model (DOM) of a web page displayed on a browser. This example will be discussed more with respect to FIG. 5. Additionally or alternatively, the log data may be displayed in a user interface, such as a console window, a notification, or the like. Additionally or alternatively, the computing device may receive log data in the form of one or more files comprising the plurality of log entries. The one or more files may be formatted in a data serialization format, such as Comma Separated Values (CSV), JavaScript Object Notation (JSON), or other equivalents thereof.

The log entries may comprise status descriptions logged by a computing device while executing software, running a server and/or web application, and/or other computing tasks. The log entries may be logged using a third-party logging instance, such as Log4j, Python Logger, or other equivalents thereof. The log entries may be classified according to different levels of importance. For example, a log entry indicating an error may include "ERROR" at the beginning of the log entry, a log entry indicating error-free completion of a task may include "UPDATE" at the beginning of the log entry, and so forth. These classifications may allow the log entries to be more easily parsed by a configured computing device.

Additionally or alternatively, the log entries may comprise status indicators for threads (e.g., processes) operating on a computing device, wherein a thread refers to a sequence of one or more programmed instructions operating on a computing device. Receiving the log data on the computing device may comprise requesting display of a plurality of threads currently operating on the computing device. Additionally or alternatively, a plurality of computing devices may be connected by a network (similar to network 103 in FIG. 1). The status indicators for the plurality of computing devices may be monitored from one computing device. Receiving the log data on the computing device may comprise requesting display of a plurality of threads operating on the plurality of computing devices connected by the network. The plurality of computing devices may be initialized and managed via an automated deployment platform, such as Jenkins, Heroku, GitLab, and/or others. For example, the log data may comprise status indicators for a plurality of threads operating on a plurality of computing devices, where the devices are deployed from a Jenkins pipeline.

Additionally or alternatively, the plurality of computing devices may be managed via a server management platform, such as Amazon Web Service (AWS), Microsoft Azure, Google Cloud, and/or others. It will be appreciated that one or more of these services may be used in concert. For example, a plurality of computing devices hosted on AWS may also be managed and deployed via Jenkins. Additional services, such as container platforms and/or other platforms, may also be used alongside one or more of these listed services.

In step 320, the computing device may identify, from the log data, a first log entry corresponding to a first error. The computing device may use one or more methods to determine that the first log entry corresponds to a first error, such as searching for indicators indicating an error, regular expressions, APIs, a machine learning model trained to identify log entries corresponding to errors, and/or other methods. For example, the computing device may search the log entries for an indicator such as "ERROR" to determine that a log entry corresponds to an error. Additionally or alternatively, the computing device may compare a regular expression to the first log entry to determine if the first log entry corresponds to a first error. This step improves the ability of the user to more quickly process and identify errors within the log data, which may otherwise be a very time-consuming and difficult process when performed manually. For example, in an instance where the log data comprises a plurality of thread status indicators, it may be very difficult to identify which status indicators correspond to an error and which do not. Additionally or alternatively, an error identification model may identify the first log entry corresponding to the first error. The error identification model may be a trained machine learning model comprising an artificial neural network comprising one or more nodes, similar to artificial neural network 200 in FIG. 2. The error identification model may be trained on data comprising at least one of: previous log entries, previous errors, the knowledgebase, the chat log, and/or other sources. Training the error identification model may comprise modifying one or more weights of the one or more nodes in the artificial neural network.

Additionally or alternatively, identifying a first log entry may comprise one or more steps to identify, from the log data, a subset of log entries. The computing device may then identify, from the subset of log entries, a first log entry corresponding to a first error. The computing device may use one or more methods to identify the subset of log entries from the log data. For example, the computing device may identify a subset of log entries based on one or more keywords in the log entries (e.g. "error," "computer ID 3," "deployment stage A9,"), processing the log entries to identify log entries with a particular identifier (e.g., an error level identifier, a risk value above a threshold, and/or the like), processing the log entries to identify the log entries based on a date or time range, and/or other methods of identifying a subset. The subset of log entries may correspond to a division present in the one or more computing devices logging the entries. For example, the subset may correspond to log entries logged by: a first device in a plurality of network-connected devices; a first deployment stage within a deployment pipeline; a first API within a web application; and/or other divisions.

The computing device may then use one or more methods for determining whether a first log entry corresponds to a first error, such as searching, pattern matching, APIs, and/or other methods as discussed above. Applying multiple error identification steps may make error identification more efficient by reducing the number of log entries to be processed in each step. For example, where the log data corresponds to status indicators for threads operating across a plurality of computing devices, a first error identification step may identify status indicators corresponding to a first computing device experiencing a first error, and a second error identification step may identify a first log entry corresponding to the first error on the first computing device.

In step 325, the computing device may determine whether a first error remediation recommendation in the first plurality corresponds to the first error. The computing device may determine whether a corresponding first error remediation recommendation exists by searching the first plurality of error remediation recommendations. It will be appreciated that the computing device may search the first plurality using standard search techniques, such as indexing, ranking, and the like. Additionally or alternatively, the computing device may provide at least one of the first error or the first log entry to the first artificial neural network, trained on the knowledgebase to determine corresponding r remediation recommendations identified from the knowledgebase. The first artificial neural network may determine whether a corresponding first error remediation recommendation in the first artificial neural network exists and may provide the corresponding first error remediation recommendation.

Additionally or alternatively, the computing device may determine whether a corresponding first error remediation recommendation exists by searching the knowledgebase. It will be appreciated that searching the knowledgebase may utilize standard search techniques, such as indexing, ranking, pattern matching, regular expression, and the like. For example, if the first log entry included a text such as "ERROR 48," the computing device may search the knowledgebase for text "ERROR 48" to determine corresponding error remediation recommendations. The computing device may determine a corresponding error remediation recommendation by identifying text containing or otherwise associated with "ERROR 48." Additionally or alternatively, the computing device may search the knowledgebase using a partial text from the first log entry, such as "48" in place of "ERROR 48." The computing device may also use a regular expression based on the text to determine corresponding error remediation recommendations. This may allow the computing device to determine corresponding error remediation recommendations based on a pattern matching the regular expression. For example, if the first log entry included a text such as "Entry point command "entrypoints/deploy" failed with exit code 1," the computing device may use "Entry point command.*exit code 1" as the regular expression. The computing device may use the regular expression to search for error remediation recommendations containing or otherwise associated with both "entry point command" and "exit code 1," but which may not contain or be otherwise associated with "entrypoints/deploy."

Based on a determination that a first error remediation recommendation corresponding to the first error exists, the computing device may cause a first output to be displayed indicating the first error remediation recommendation in step 330. The first output may be displayed on a screen, similar to monitor 120 in FIG. 1 or the screen component of device 109 in FIG. 1. The first output may be displayed to a console window accessed on the computing device. The first output may be displayed within a browser. Additionally or alternatively, the first output may be displayed within or via a browser extension; this example will be discussed further with respect to FIG. 5.

Based on a determination that a first error remediation recommendation corresponding to the first error does not exist in the first plurality, the computing device may cause an output to be displayed indicating the lack of corresponding error remediation recommendations. For example, the computing device may cause output such as "No corresponding error remediation recommendation found." Additionally or alternatively, the computing device may not cause any output to be displayed if no corresponding error remediation recommendation exists in the first plurality.

The first output may comprise the first error remediation recommendation, the first error, the first log entry, and/or additional data. Additionally or alternatively, the first output may comprise a Uniform Resource Locator (URL), where the URL may provide a link to the first error remediation recommendation. Additionally or alternatively, the first output display may comprise an electronic communication such as email, message, notification, and/or the like. The first output may be sent over a network to a user, wherein the network may be similar to network 103 in FIG. 1. The first output may also be written to a file.

In step 335, the computing device may determine whether a second error remediation recommendation in the second plurality corresponds to the first error. The computing device may determine whether a corresponding second error remediation recommendation exists by searching the second plurality of error remediation recommendations. It will be appreciated that the computing device may search the second plurality using standard search techniques, such as indexing, ranking, and the like. Additionally or alternatively, the computing device may provide at least one of the first error or the first log entry to the second artificial neural network, trained on the chat log to determine corresponding error remediation recommendations identified from the chat log. The second artificial neural network may determine whether a corresponding second error remediation recommendation in the second artificial neural network exists and may provide the corresponding second error remediation recommendation.

Additionally or alternatively, the computing device may determine whether a corresponding second error remediation recommendation exists by searching the chat log. It will be appreciated that the computing device may use standard search techniques when searching the knowledgebase, such as indexing, ranking, pattern matching, regular expressions, and the like. For example, if the first log entry included a text such as "ERROR 48," the computing device may search the chat log for text "ERROR 48" to determine corresponding error remediation recommendations. The computing device may determine a corresponding error remediation recommendation by identifying text containing or otherwise associated with "ERROR 48." Additionally or alternatively, the computing device may search the chat log using a partial text from the first log entry, such as "48" in place of "ERROR 48." The computing device may also use a regular expression based on the text to determine corresponding error remediation recommendations. This may allow the computing device to determine corresponding error remediation recommendations based on a pattern matching the regular expression. For example, if the first log entry included a text such as "Entry point command "entrypoints/deploy" failed with exit code 1," the computing device may use "Entry point command.*exit code 1" as the regular expression. The computing device may use the regular expression to search for error remediation recommendations containing or otherwise associated with both "entry point command" and "exit code 1," but which may not contain or be otherwise associated with "entrypoints/deploy."

Based on the determination that a second error remediation recommendation corresponding to the first error exists, the computing device may cause a second output to be displayed indicating the second error remediation recommendation in step 340. The second output may be displayed on a screen, similar to monitor 120 in FIG. 1 or the screen component of device 109 in FIG. 1. The second output may be displayed to a console window accessed on the computing device. The second output may be displayed within a browser. Additionally or alternatively, the second output may be displayed within or via a browser extension; this example will be discussed further with respect to FIG. 5.

Based on a determination that a second error remediation recommendation corresponding to the first error does not exist in the second plurality, the computing device may cause an output to be displayed indicating the lack of corresponding error remediation recommendations. For example, the computing device may cause output such as "No corresponding error remediation recommendation found." Additionally or alternatively, the computing device may not cause any output to be displayed if no corresponding error remediation recommendation exists in the second plurality.

The second output may comprise the second error remediation recommendation, the first error, the first log entry, and/or additional data. Additionally or alternatively, the second output may comprise a Uniform Resource Locator (URL), where the URL may provide a link to the second error remediation recommendation. Additionally or alternatively, the second output may comprise one or more text messages from the chat log, wherein the text messages correspond to the second error remediation recommendation. Additionally or alternatively, the second output display may comprise an electronic communication such as email, message, notification, and/or the like. The second output may be sent over a network to a user, wherein the network may be similar to network 103 in FIG. 1. The second output may also be written to a file.

The error remediation recommendation method described above may also be further modified with additional error remediation recommendation data sources. For example, FIG. 3 depicts the use of an additional artificial neural network to determine error remediation recommendations. It will be appreciated that, while the steps shown in FIG. 2 are not shown in FIG. 3, the steps shown in FIG. 2 describing how the computing device may process the knowledgebase, chat log, and/or additional data sources may be implemented prior to the steps shown in FIG. 3. Similar to FIG. 2, the method shown in FIG. 3 may be implemented with a computing device similar to computing device 101 from FIG. 1.

In step 345, the computing device may identify a third error corresponding to a third log entry in a plurality of log entries. As discussed with respect to step 320 in FIG. 3, the computing device may receive the plurality of log entries via a process similar to that described in step 320 in FIG. 3. For example, the computing device may receive the log entries via a browser extension scraping the DOM, parsing a data serialized file, accessing log data for a device similar to devices 105, 107, and 109 in FIG. 1, and/or other methods. The computing device may also identify the third error via a process similar to those described in step 325 in FIG. 1. For example, the computing device may identify the third log entry by comparing the third log entry to a regular expression, use a trained model to identify the error, and/or other methods.

In step 350, the computing device may determine whether the third error corresponds to an error remediation recommendation in the first or second pluralities of error remediation recommendations. As described with respect to FIG. 1, the first plurality of error remediation recommendations may correspond to the knowledgebase and the second plurality of error remediation recommendations may correspond to the chat log. The computing device may determine if the third error has a corresponding error remediation recommendation in the first and second pluralities of error remediation recommendations by, for example, searching the first and second pluralities for a corresponding error remediation recommendation. This process is described in more detail with respect to steps 325 and 335 in FIG. 3.

Based on a determination that one or more error remediation recommendations corresponding to the third error exists in the first and/or second pluralities of error remediation recommendations, the computing device may cause output indicating the one or more corresponding error remediation recommendations to be displayed in step 355. The computing device may cause the output to be displayed on a screen similar to monitor 120 in FIG. 1. Additionally or alternatively, the computing device may cause the display via an electronic communication, a browser, and/or other methods of display. The computing device may also cause the display using methods similar to those discussed with respect to the display of the first and second outputs as described in step 330 and 340 in FIG. 3.

Based on a determination that no error remediation recommendations corresponding to the third error exist in the first or second pluralities, the computing device may provide the third error and/or the third log entry to an error remediation recommendation model, wherein the error remediation recommendation model may be a trained machine learning model. The error remediation recommendation model may comprise an artificial neural network comprising one or more nodes, similar to artificial neural network 200 in FIG. 2. Training the error remediation recommendation model may comprise modifying one or more weights of the one or more nodes in the artificial neural network. The error remediation recommendation model may be trained on data that may comprise at least one of: the plurality of log entries, the knowledgebase, or the history of text messages. The plurality of log entries may comprise log entries from one or more different sources. For example, the plurality of log entries may comprise at least one of log entries from Jenkins, AWS, applications, and/or others. The weights may be modified based on one or more characteristics of the at least one of the plurality of log entries, the knowledgebase, or the history of text messages. For example, the weights may be modified to favor error remediation recommendations from the knowledgebase. Additionally or alternatively, the weights may be modified to favor error remediation recommendations corresponding to more recent text messages.

In step 365, the computing device may receive, from the error remediation recommendation model, a third error remediation recommendation corresponding to the third error, wherein the third error remediation recommendation may be generated by the third error remediation recommendation model. The third error remediation recommendation model may determine the corresponding third error remediation recommendation based on the third log entry. For example, the computing device may provide text from the third log entry to the error remediation recommendation model, wherein the error remediation recommendation may use all or part of the text to generate the third error remediation recommendation.

In step 370, the computing device may cause a third output indicating the third error remediation recommendation to be displayed. The computing device may display the third output via a browser extension operating on the computing device, as will be discussed further with respect to FIG. 5. Additionally or alternatively, the computing device may also cause display of the third output via a browser operating on the computing device, a console window operating on the computing device, an electronic communication, writing the third output to a file, and/or other methods as discussed above with respect to steps 340 and 350 in FIG. 3.

Additionally or alternatively, the computing device may receive input, from a user, indicating whether the third error remediation recommendation fixed the third error. The computing device may further train the trained machine learning model based on this input.

Figure 5:
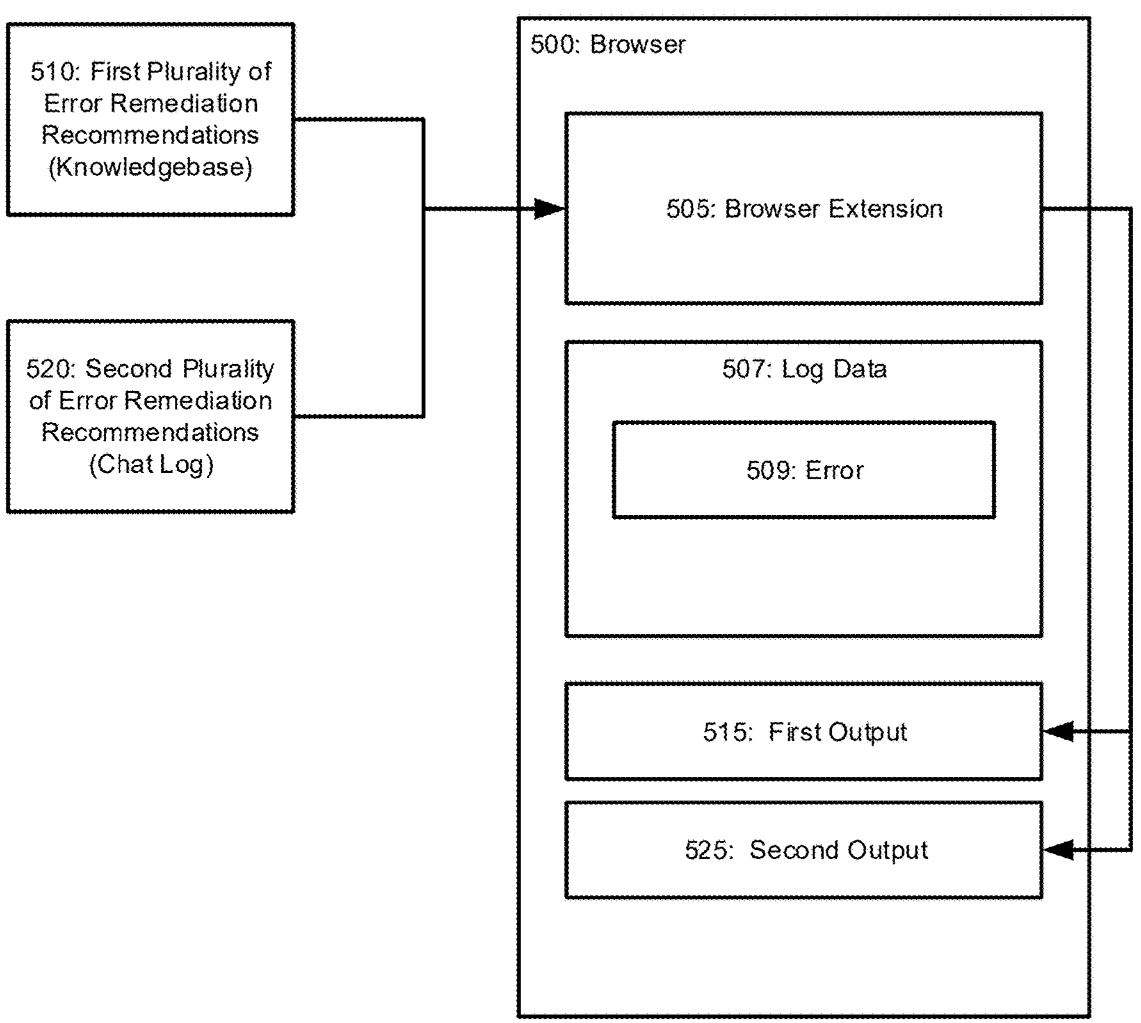
FIG. 5 depicts an example of a system in which automated error remediation recommendations may be implemented, using a browser extension to process error remediation recommendations from a knowledgebase and a chat log, identify errors from log entries displayed on a web page, and display corresponding error remediation recommendations.

One example of a system by which these methods may be implemented is depicted in FIG. 5. It will be appreciated that FIG. 5 depicts only one possible arrangement by which the automated error remediation recommendations method may be implemented. Other implementations and/or modifications may be possible based on the number and types of data sources, the method by the data sources may be processed, the method of receiving log entries, the method of determining error remediation recommendations, and the method of causing output indicating the error remediation recommendations to be displayed.

Figure 4:
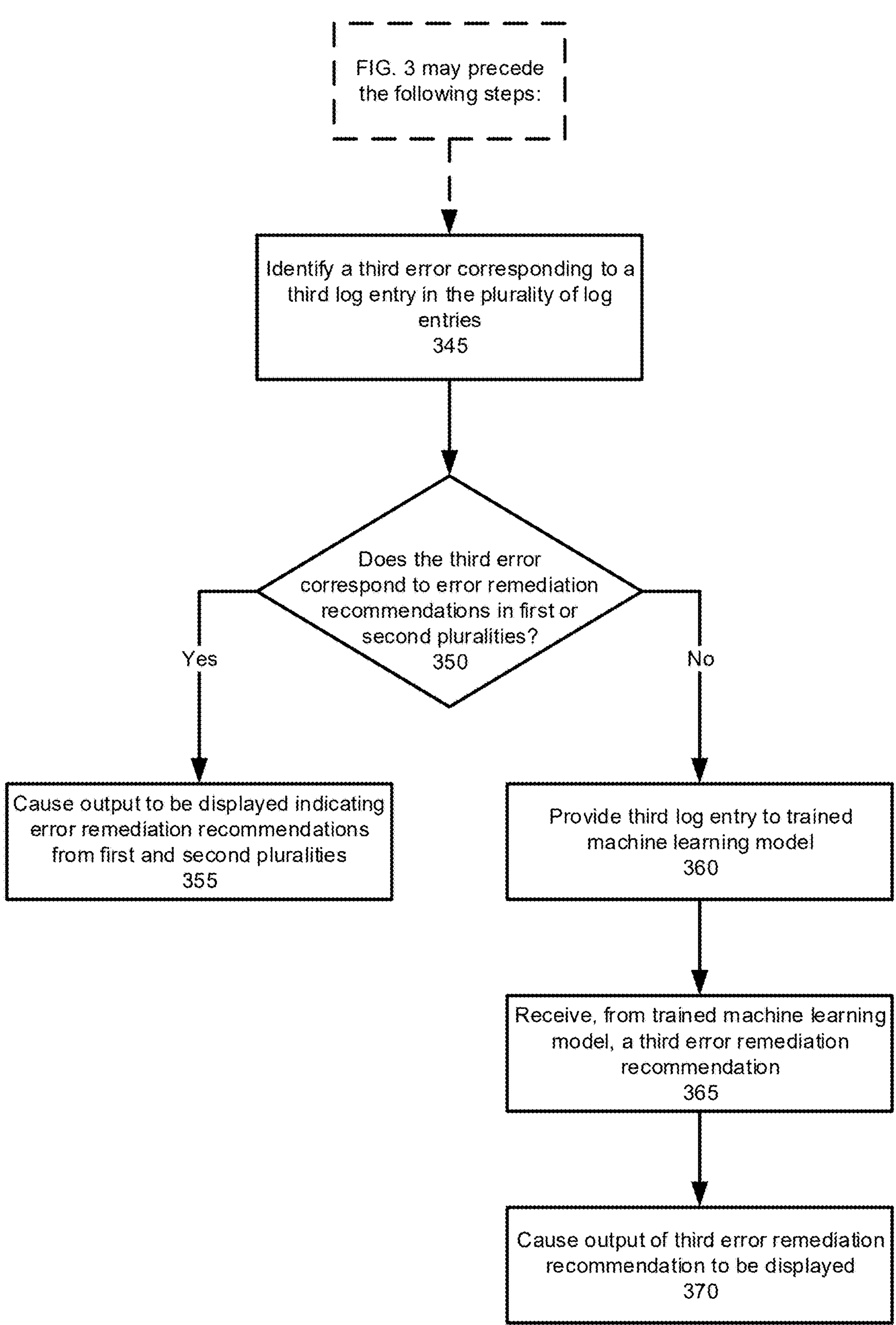
FIG. 4 depicts an example method of identifying an error in the plurality of log entries, determining if the error corresponds to an error remediation recommendation in existing pluralities of error remediation recommendations, and if no corresponding error remediation recommendation is found, providing the log entry to a trained machine learning model.

FIG. 5 may depict a system by which the steps described with respect to FIGS. 3 and 4 may be implemented. For example, steps performed in the system depicted in FIG. 5 may comprise one or more of: processing a knowledgebase, processing a chat log, receiving log entries, identifying an error in the log entries, determining corresponding error remediation recommendations based on processing the knowledgebase, determining corresponding error remediation recommendations based on processing the chat log, and causing display of an output indicating the corresponding error remediation recommendations. Additionally or alternatively, the system in FIG. 5 may enact steps similar to those discussed in FIG. 4. For example, steps performed in the system depicted in FIG. 5 may comprise one of more of: training a machine learning model, providing the error to the machine learning model, receiving a model-generated error remediation recommendation, and causing display of output indicating the model-generated error remediation recommendation.

In FIG. 5, browser 500 may be operating on a first computing device, which may be similar to computing device 101 depicted in FIG. 1. Additionally or alternatively, the first computing device may be similar to devices 105, 107, and/or 109 in FIG. 1. Although the first computing device is not depicted in FIG. 5, it will be appreciated that a user may be accessing browser 500 via the first computing device. The user may also access browser 500 via similar devices, such as devices similar to device 105, 107, and/or 109 in FIG. 1. Additionally or alternatively, the user may access browser 500 through a mobile device.

Browser extension 505 may operate on browser 500. Browser extension 505 may process the knowledgebase to identify first plurality of error remediation recommendations 510 in steps similar to those described with respect to FIG. 3, such as processing the knowledgebase via a natural language processing algorithm. Additionally or alternatively, the knowledgebase may be processed by a second computing device, which may be similar to devices 101, 105, 107, or 109 as depicted in FIG. 1.

First plurality of error remediation recommendations 510 may be stored locally, such as within browser 500, browser extension 505, and/or on the first computing device. Additionally or alternatively, first plurality of error remediation recommendations 510 may be stored on the second computing device, where the second computing device may be connected to browser extension 505 (e.g., browser extension 505 operating on the first computing device) by a network similar to network 103 in FIG. 1. It will be appreciated that the knowledgebase may be processed to identify first plurality of error remediation recommendations 510 asynchronously. Additionally or alternatively, first plurality of error remediation recommendations 510 may represent the knowledgebase.

Second plurality of error remediation recommendations 520 may be processed, stored, and accessed in similar ways as first plurality 510. Browser extension 505 may process the chat log, comprising a history of text messages, to identify second plurality 520. This process may be similar to that discussed with respect to FIG. 3. For example, browser extension 505 may process the chat log via a natural language processing algorithm. Additionally or alternatively, the chat log may be processed to identify second plurality 520 by a third computing device, which may be similar to devices 101, 105, 107, or 109 as depicted in FIG. 1.

The second plurality of error remediation recommendations 520 may be stored locally, such as within browser 500, browser extension 505, and/or on the first computing device. Additionally or alternatively, second plurality of error remediation recommendations 520 may be stored on the third computing device, where the third computing device may be connected to browser extension 505 (e.g., browser extension 505 operating on the first computing device) by a network similar to network 103 in FIG. 1. The second and third computing devices may be the same. Additionally or alternatively, the second and/or third computing devices may represent third-party devices, such as a cloud server managed by a third party. It will be appreciated that the chat log may be processed to identify second plurality of error remediation recommendations 520 asynchronously. Additionally or alternatively, first plurality of error remediation recommendations 520 may represent the chat log.

Log data 507 may comprise a plurality of log entries displayed via browser 500. Log data 507 may comprise entries in the Document Object Model (DOM) of browser 500. Browser extension 505 may receive log data 507 by scraping the DOM of browser 500. Additionally or alternatively, browser extension 505 may receive log data 507 by reading requests to or from browser 500, such as API requests to and responses from a third-party server. Additionally or alternatively, browser extension 505 may read information logged to the console of browser 500. For example, an API request from browser 500 that fails to execute properly may log an error to the console of browser 500 which browser extension 505 may read as log data 507.

Additionally or alternatively, log data 507 may comprise data, logged by one or more additional computing devices, displayed via browser 500. For example, log data 507 may comprise logs from an automated deployment and/or server management system managing a plurality of computing devices, such as Jenkins, Kubernetes, AWS, and/or others. Additionally or alternatively, log data 507 may comprise status indicators for threads (e.g., processes) operating on a computing device, as discussed with respect to step 315 in FIG. 3.

Browser extension 505 may identify error 509 from log data 507. Browser extension 505 may use one or more methods for identifying error 509, such as searching for an error indicator, regular expression comparison, a trained model for identifying errors, and/or other methods. This configuration may allow a user to more quickly identify errors within existing methods of viewing log data, such as via an online log viewer displayed via a browser.

Browser extension 505 may determine whether error 509 has a corresponding error remediation recommendation in first plurality of error remediation recommendations 510. As previously discussed with respect to step 325 in FIG. 3, this process may comprise searching first plurality 510, searching the knowledgebase, comparing the log entry corresponding to error 509 to error remediation recommendations in first plurality 510, and/or other methods of comparison.

Based on a determination that error 509 has a corresponding error remediation recommendation in a first plurality of error remediation recommendations 510, browser extension 505 may cause the display of first output 515 indicating the corresponding error remediation recommendation. First output 515 may be displayed within browser 500. First output 515 may be displayed automatically upon determining the corresponding error remediation recommendation. Additionally or alternatively, first output 515 may be displayed based on a user interaction with browser extension 505, browser 500, log data 507, and/or other elements.

First output 515 may comprise a URL, allowing a user to access the source of the error remediation recommendation within first plurality 510 and/or the knowledgebase. For example, first output 515 may comprise a URL to a page in a GitHub repository. Additionally or alternatively, first output 515 may indicate one or more error remediation recommendations, based on error 509 corresponding to one or more error remediation recommendations within first plurality 510.

First output 515 may also comprise previously discussed outputs similar to those discussed with respect to step 330 in FIG. 3, such as electronic communications, notifications, and/or other. Additionally or alternatively, browser extension 505 may provide the ability for a user to trigger additional forms of output, such as an electronic communication.

Browser extension 505 may determine whether error 509 has a corresponding error remediation recommendation in second plurality of error remediation recommendations 520. As previously discussed with respect to step 340 in FIG. 3, this process may comprise searching second plurality 520, searching the chat log, comparing the log entry corresponding to error 509 to error remediation recommendations in second plurality 520, and/or other methods of comparison.

Based on a determination that error 509 has a corresponding error remediation recommendation in a second plurality of error remediation recommendations 520, the browser extension 505 may cause the display of second output 525 indicating the corresponding error remediation recommendation. Second output 525 may be displayed within browser 500. Second output 525 may be displayed automatically upon determining the corresponding error remediation recommendation. Additionally or alternatively, second output 525 may be displayed based on a user interaction with browser extension 505, browser 500, log data 507, and/or other elements.

Second output 525 may comprise a URL, allowing a user to access the source of the error remediation recommendation within second plurality 520 and/or the knowledgebase. For example, if the corresponding error remediation recommendation is a conversation in an enterprise messaging system, second output 525 may comprise a URL linking the text messages comprising the error remediation recommendation. Additionally or alternatively, second output 525 may comprise text messages from which the corresponding error remediation recommendation was processed. Additionally or alternatively, second output 525 may indicate one or more error remediation recommendations, based on error 509 corresponding to one or more error remediation recommendations within second plurality 520.

Second output 525 may also comprise previously discussed outputs similar to those discussed with respect to step 340 in FIG. 3, such as electronic communications, notifications, and/or other. Additionally or alternatively, browser extension 505 may provide the ability for a user to trigger additional forms of output, such as an electronic communication. For example, browser extension 505 may provide a URL which opens a message window within the enterprise messaging service, where the user may message one or more users who sent the text messages from which the corresponding error remediation recommendation was processed.

It will be appreciated that other implementations of the described method may also be possible and/or implemented alongside the example described with respect to FIG. 4. For example, the computing device may determine whether any one or more of the first plurality of error remediation recommendations, the second plurality of error remediation recommendations, and/or the trained machine learning model have one or more corresponding error remediation recommendations. The computing device may cause output indicating one or more corresponding error remediation recommendations from each data source. Additionally or alternatively, the computing device may follow a predetermined order of data sources wherein the computing device only determines whether a sequential data source has a corresponding error remediation recommendation when prior data sources do not have a corresponding error remediation recommendation. For example, when the computing device determines that a corresponding error remediation recommendation exists in the first plurality of error remediation recommendations, the computing device may not determine whether a corresponding error remediation recommendation exists in the second plurality of error remediation recommendations.

Additionally or alternatively, the error remediation recommendation process may comprise additional data sources. For example, data sources may comprise a first knowledgebase comprising private code repositories, a second knowledgebase comprising Internet-accessible records, a first chat log comprising a chat log from an enterprise messaging system, a second chat log comprising posts on StackOverflow, and/or more data sources. The computing device may process each data source into a corresponding plurality of error remediation recommendations. For example, a first plurality comprising error remediation recommendations may be identified from the private code repositories, a second plurality comprising error remediation recommendations may be identified from the Internet-accessible records, and so forth. Additionally or alternatively, a first plurality of error remediation recommendations may comprise error remediation recommendations identified from multiple data sources.

Additionally or alternatively, an error identification model may be a machine learning model trained on data comprising log data from one or more sources. For example, an error identification model may be trained on log entries logged from Jenkins, AWS, applications, and/or additional sources. Training an error identification model based on one or more sources may allow the error identification model to be applied to multiple platforms. For example, a plurality of computing devices hosted on AWS and deployed via Jenkins may log errors both from AWS and Jenkins to the log data, where an error identification model trained on both AWS and Jenkins errors may be able to identify errors from both platforms.

Additionally or alternatively, the computing device may determine one or more corresponding error remediation recommendations from the one or more data sources and cause output to be displayed indicating the one or more corresponding error remediation recommendations. The output may be organized to display the one or more corresponding error remediation recommendations in a determined order. Order may be determined by one or more metrics, such as "relevance", most recently updated, indications that an error remediation recommendation was successful, and/or other characteristics. For example, the output may be organized to display error remediation recommendations corresponding to messages, in the first chat log, which: correspond to an official support channel, were updated most recently, indicate that the error remediation recommendation was previously successful, and/or other metrics.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device configured to provide automatic error remediation recommendations for an error in an automated deployment system,
 the computing device comprising:
  one or more processors; and
  memory storing instructions that, when executed by the one or more processors, cause the computing device to:
 train, based on a knowledgebase comprising a first plurality of error remediation recommendations, a first artificial neural network to output an error remediation recommendation based on an input of a log entry indicating an error;
 train, based on a chat log comprising a second plurality of error remediation recommendations, a second artificial neural network to output an error remediation recommendation based on an input of a log entry indicating an error;
 display, on a browser executing on the computing device, log data comprising a plurality of log entries, wherein each of the plurality of log entries corresponds to one or more computing devices managed via the automated deployment system, and wherein:

provide, to the first artificial neural network, a first log entry and a first identifier corresponding to a first computing device, wherein:

the first log entry is from the plurality of log entries, the first log entry is a thread status indicator from the first computing device in the one or more computing devices managed via the automated deployment system, and the first log entry indicates a first error on the first computing device;

receive, from the first artificial neural network and based on the at least a portion of the first log entry, a first error remediation recommendation corresponding to the first error:

generate a first output, wherein the first output indicates the first error remediation recommendation, the first computing device, and a first URL corresponding to the first error remediation recommendation;

provide, to the second artificial neural network, the at least a portion of the first log entry;

receive, from the second artificial neural network and based on the at least a portion of the first log entry, a second error remediation recommendation corresponding to the first error:

generate a second output, wherein the second output indicates the second error remediation recommendation, the first computing device, and a second URL configured to open a text message service;

cause the first and second outputs to be displayed, in the browser executing on the computing device, where the first log entry is displayed;

receive, based on user input, an indication whether the first error remediation recommendation and/or the second error remediation recommendation fixed the first error; and train, based on the indication and for each artificial neural network, the first artificial neural network and the second artificial neural network.

2. The computing device of claim 1, wherein the first artificial neural network comprises one or more nodes, and the instructions, when executed by the one or more processors, further cause the computing device to train the first artificial neural network by:

modifying one or more weights of the one or more nodes of the first artificial neural network.

3. The computing device of claim 1, wherein the instructions, when executed by the one or more processors, cause the computing device to:

receive, via a browser extension operating on the browser executing on the computing device, the log data, wherein the log data comprises data in a Document Object Model (DOM) of a web page displayed by the browser on the computing device.

4. The computing device of claim 1, wherein the instructions, when executed by the one or more processors, cause the computing device to display log data from a file, wherein:

the file comprises the log data, and wherein the log data is formatted in a serialized data format.

5. The computing device of claim 1, wherein the thread status indicator indicates a status for a plurality of threads running on the first computing device; and wherein a thread, of the plurality of threads, corresponds to a computing process on the first computing device.

6. The computing device of claim 1, wherein the instructions, when executed by the one or more processors, cause the computing device to provide the first log entry based on a comparison of the first log entry to a regular expression.

7. The computing device of claim 1, wherein the instructions, when executed by the one or more processors, further cause the computing device to:

provide, by the computing device and from the plurality of log entries, a second log entry indicating a second error;

provide, to the first artificial neural network, at least a portion of the second log entry;

receive, from the first artificial neural network, an indication that no error remediation recommendation corresponds to the second error; and cause a third output to be displayed, in the browser executing on the computing device, wherein the third output indicates that no corresponding error remediation recommendation exists.

8. A computer-implemented method for providing automatic error remediation recommendations for an error in an automated deployment system, comprising:

training, based on a knowledgebase comprising a first plurality of error remediation recommendations, a first artificial neural network to output an error remediation recommendation based on an input of a log entry indicating an error;

training, based on a chat log comprising a second plurality of error remediation recommendations, a second artificial neural network to output an error remediation recommendation based on an input of a log entry indicating an error;

displaying, on a browser executing on a user device, log data comprising a plurality of log entries, wherein each of the plurality of log entries corresponds to one or more computing devices managed via the automated deployment system;

providing, to the first artificial neural network, a first log entry and a first identifier corresponding to a first computing device, wherein:

the first log entry is from the plurality of log entries, the first log entry is a thread status indicator from the first computing device in the one or more computing devices managed via the automated deployment system, and the first log entry indicates a first error on the first computing device;

providing, to the first artificial neural network, at least a portion of the first log entry;

receiving, from the first artificial neural network and based on the at least a portion of the first log entry, a first error remediation recommendation corresponding to the first error:

generating a first output, wherein the first output indicates the first error remediation recommendation, the first computing device, and a first URL corresponding to the first error remediation recommendation;

providing, to the second artificial neural network, the at least a portion of the first log entry;

receiving, from the second artificial neural network and based on the at least a portion of the first log entry, a second error remediation recommendation corresponding to the first error:

generating a second output, wherein the second output indicates the second error remediation recommendation, the first computing device, and a second URL configured to open a text message service;

causing the first and second outputs to be displayed, in the browser executing on the user device, where the first log entry is displayed;

receiving, based on user input, an indication whether the first error remediation recommendation and/or the second error remediation recommendation fixed the first error; and further training, based on the indication and for each artificial neural network, the first artificial neural network and the second artificial neural network.

9. The method of claim 8, wherein:

the first artificial neural network comprises one or more nodes and training the first artificial neural network further comprises modifying one or more weights of the one or more nodes of the first artificial neural network.

10. The computer-implemented method of claim 8, wherein the thread status indicator indicates a status for a plurality of threads running on the first computing device;

and wherein a thread, of the plurality of threads, corresponds to a computing process on the first computing device.

11. The computer-implemented method of claim 8, further comprising providing the first log entry based on a comparison of the first log entry to a regular expression.

12. The computer-implemented method of claim 8, further comprising:

providing, from the plurality of log entries, a second log entry indicating a second error;

providing, to the first artificial neural network, at least a portion of the second log entry;

receiving, from the first artificial neural network, an indication that no error remediation recommendation corresponds to the second error; and causing a third output to be displayed, in the browser executing on the user device, wherein the third output indicates that no corresponding error remediation recommendation exists.

13. The computer-implemented method of claim 8, further comprising:

receiving, via a browser extension operating on the browser executing on the user device, the log data, wherein the log data comprises data in a Document Object Model (DOM) of a web page displayed by the browser on the user device.

14. The computer-implemented method of claim 8, further comprising displaying log data from a file, wherein:

the file comprises the log data, and wherein the log data is formatted in a serialized data format.

15. One or more non-transitory computer-readable media storing instructions that, when executed by one or more processors, cause a computing device to perform steps to provide automatic error remediation recommendations for an error in an automated deployment system, comprising:

training, based on a knowledgebase comprising a first plurality of error remediation recommendations, a first artificial neural network to output an error remediation recommendation;

training, based on a chat log comprising a second plurality of error remediation recommendations, a second artificial neural network to output an error remediation recommendation;

displaying, on a browser executing on a user device, log data comprising a plurality of log entries, wherein each of the plurality of log entries corresponds to one or more computing devices within the automated deployment system;

providing, to the first artificial neural network, a first log entry and a first identifier corresponding to a first computing device, wherein:

the first log entry is from the plurality of log entries, the first log entry is a thread status indicator from a first computing device in the one or more computing devices managed via the automated deployment system, and the first log entry indicates a first error on the first computing device;

receiving, from the first artificial neural network and based on the at least a portion of the first log entry, a first error remediation recommendation corresponding to the first error:

generating a first output, wherein the first output indicates the first error remediation recommendation, the first computing device, and a first URL configured to link to a source of the first error remediation recommendation;

providing, to the second artificial neural network, the at least a portion of the first log entry;

receiving, from the second artificial neural network and based on the at least a portion of the first log entry, a second error remediation recommendation corresponding to the first error:

generating a second output, wherein the second output indicates the second error remediation recommendation, the first computing device, and a second URL configured to open a text message service;

causing the first and second outputs to be displayed, in the browser executing on the user device, where the first log entry is displayed;

receiving, based on user input, an indication whether the first error remediation recommendation and/or the second error remediation recommendation fixed the first error; and further training, based on the indication and for each artificial neural network, the first artificial neural network and the second artificial neural network.

16. The one or more non-transitory computer-readable media of claim 15, wherein the instructions, when executed by one or more processors, cause the computing device to:

wherein the thread status indicator indicates a status for a plurality of threads running on the first computing device; and wherein a thread, of the plurality of threads, corresponds to a computing process on the first computing device.

17. The one or more non-transitory computer-readable media of claim 15, wherein the instructions, when executed by one or more processors, cause the computing device to:

provide, from the plurality of log entries, a second log entry indicating a second error;

provide, to the first artificial neural network, at least a portion of the second log entry;

receive, from the first artificial neural network, an indication that no error remediation recommendation corresponds to the second error; and cause a third output to be displayed, in the browser executing on the computing device, wherein the third output indicates that no corresponding error remediation recommendation exists.

18. The one or more non-transitory computer-readable media of claim 15, wherein the instructions, when executed by one or more processors, cause the computing device to provide the first log entry based on a comparison of the first log entry to a regular expression.

19. The one or more non-transitory computer-readable media of claim 15, wherein the first artificial neural network comprises one or more nodes, and the instructions, when executed by one or more processors, further cause the computing device to train the first artificial neural network by:

modifying one or more weights of the one or more nodes of the first artificial neural network.

20. The one or more non-transitory computer-readable media of claim 15, wherein the instructions, when executed by one or more processors, cause the computing device to:

receive, via a browser extension operating on the browser executing on the user device, the log data, wherein the log data comprises data in a Document Object Model (DOM) of a web page displayed by the browser on the user device.

* * * * *